Oct. 27, 1970  F. TÖNNE ETAL  3,536,314

FRICTION SPRING

Filed June 7, 1968

Inventors:
FRANZ TÖNNE
JOSEF FRIEDRICHS

By: Michael S. Striker
Attorney

United States Patent Office 3,536,314
Reissued Oct. 27, 1970

3,536,314
FRICTION SPRING
Franz Tönne, Dusseldorf, and Josef Friedrichs, Krefeld-Bockum, Germany, assignors to Ringfeder GmbH, Krefeld-Urdingen, Germany
Filed June 7, 1968, Ser. No. 735,311
Claims priority, application Germany, June 8, 1967, R 46,213
Int. Cl. F16f 1/08
U.S. Cl. 267—135                     4 Claims

ABSTRACT OF THE DISCLOSURE

A friction spring including a plurality of circumferential closed outer rings and a plurality of closed or split inner rings with engaging conical contact surfaces which are axially movable with respect to each other under application of axial pressure to the rings and in which the cone angle of the outer surfaces of the inner rings is smaller than the cone angle of the inner surfaces of the outer rings.

BACKGROUND OF THE INVENTION

The present invention relates to friction springs composed of a plurality of circumferentially closed outer rings and similar or split inner rings with conical contact surfaces which are movable relative to each other under application of axial pressure to the rings. Such springs are adapted to absorb high axial pressure and to provide for fast damping of axial movements while requiring very little space and such springs are therefore used in applications in which it is required to absorb impacts of large energy and to dampen such impacts. Such springs are especially used for buffers on railroad vehicles, motor cars, airplanes and similar vehicles or machines.

It is known to provide the conical contact surfaces of the inner and outer rings with equal cone angles. Under application of an axial pressure to such springs the outer conical surfaces of the inner rings are moved in axial direction relative to the inner conical surfaces of the outer rings, whereby the outer rings are subjected to tension and the inner rings to compression stresses. In such an axially compressed spring the rings may be considered as being in a state of equilibrium in which the rings exert elastic forces on an elastic supporting surface. Mathematically, however, it is not possible to precisely define the stress concentration in the rings as would be necessary to increase the working service of the spring. Extensive research has shown that in addition to various technical factors, as for instance the composition of the spring steel, the grain structure of the steel, the manner of hardening of the steel, the surface finish of the rings and any lubrication provided on these surfaces, the cone angle of the engaging surfaces is of decisive importance for the useful life of the spring. The circumferential stresses create, as known, in the cross-sections of the rings radial forces which at all surface portions of the engaging rings are respectively directed opposite to each other. These radial forces may be considered to be concentrated in the center of gravity $F_{si}$ of the cross-section of the inner ring and $F_{sa}$ of the cross-section of the outer ring, which forces form thus a moment. This results in the inner and the outer ring in an additional reduction, respectively increase of the diameter. The thus-resulting stress increase may lead in ring cross-sections with equal cone angles at the engaging contact surface, already before the theoretically maximum load value is reached, to a deformation at the end-faces of the rings. For the function of the spring this is unimportant as far as the compression-stressed inner rings are concerned; however, as far as the tensioned-stressed outer rings are concerned, these increased tension stresses at the axial ends of the rings lead sooner or later to a fracture of the outer rings and therewith to a loss of two spring elements.

It is also known, as for instance disclosed in the Australian Pat. No. 142,128, to construct the inner and outer rings of a friction spring of the aforementioned kind so that each ring has two contact surface portions with different cone angles to provide in this way a progressive increase of the spring characteristic. The gradation of the contact surfaces leads at the smaller angle thereof to an improved relationship between spring action and total spring length, whereas the larger cone angle leads to a fast release of the spring tension. In the compressed position of the spring, the rings will, however, engage each other only with a portion of the contact surfaces thereof, that is with the portion of greater cone angle. This will result in a non-uniform and unfavorable stress distribution in the ring cross-sections, which, in the outer rings which are stressed under tension, will lead to a deformation of the ring starting at the ring endface.

Friction springs are also known, as for instance shown in the German Pat. No. 441,741, in which the spring is composed of concavely curved inner rings and convexly curved outer rings. In the unloaded condition of the spring, the rings will engage each other with line contact and under axial load the radii of curvature of the rings will change so that the rings will engage each other with a surface contact whereby the outer rings will be expanded and the inner rings compressed. In the fully loaded position of such a spring, the contact surfaces of the rings will, due to the elastic deformation of the rings, only be partially engaged with each other, whereby a non-uniform and unfavorable stress distribution in the ring cross-sections will occur which may lead, as in the above-discussed case, to a fracture of the outer rings.

It is an object of the present invention to provide for a friction spring of the aforementioned kind which avoids the disadvantages of such friction springs known in the art.

It is a further object of the present invention to provide for a friction spring of the aforementioned kind in which the stress distribution in the outer ring is such so as to incraese the useful life of the spring.

SUMMARY OF THE INVENTION

With these objects in view, the friction spring according to the present invention mainly comprises at least two outer rings having inner conical surfaces and at least one inner ring located between the outer rings and having outer conical surfaces in contact with the inner conical surfaces of the outer rings and arranged in such a manner that said surfaces may slidingly move relative to each other under application of axial pressure to the rings, and in which the cone angle of the outer surface of the inner rings is smaller than the cone angle of the inner surface of the outer rings.

Preferably, the difference between the cone angles of the aforementioned surfaces is about 1 degree.

The outer rings are circumferentially closed rings whereas the inner rings may either be also circumferentially closed rings or split rings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
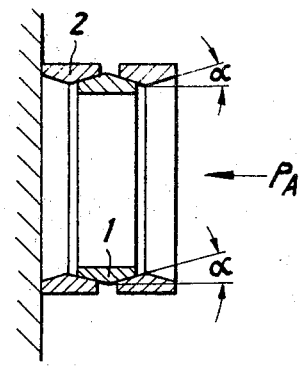
FIG. 1 is a schematic axial cross-section through a friction spring according to the prior art and showing the spring in unloaded condition.
Figure 2:
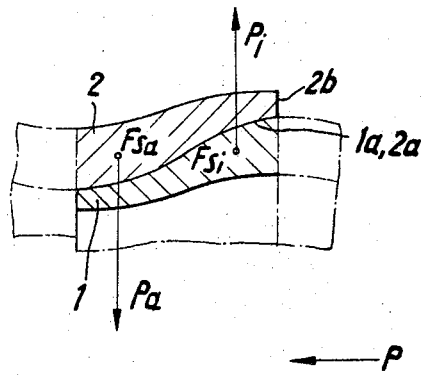
FIG. 2 is a partial cross-section similar to FIG. 1 and showing half of an inner ring and half of an outer ring in deformed condition occuring during axial loading of the spring.

FIG. 1 schematically illustrates a friction spring according to the prior art in which the engaging outer faces of the inner ring 1 and the inner faces of the outer ring 2 are inclined under the same angle $\alpha$ with respect to the ring axis, that is the cone angle of the frustoconical inner and outer faces is $2\alpha$. While FIG. 1 illustrates only a single inner ring 1 and two outer rings 2 co-operating therewith, it is to be understood that the friction spring may include a plurality of inner rings and outer rings with the outer faces of the inner rings engaging the inner faces of the outer rings as shown in FIG. 1. FIG. 2, which shows half of an outer ring and half of an inner ring of a spring construction as shown in FIG. 1, in which the engaging faces have the same cone angle, further illustrates the manner in which the engaging faces 1a and 2a are deformed under the influence of the moment produced by the radial forces $P_i$ and $P_a$ acting in the centers of gravity $F_{si}$ and $F_{sa}$ of cross-sections of the rings and resulting from the axial force P applied to the spring. As seen in FIG. 2, the outer ring 2 is deformed under tension to a maximum at the right end thereof, as viewed in FIG. 2, that is in the region of the endface 2b and this resulting stress peak may lead to a premature destruction of the outer ring 2 which is under tension, that is a tearing of the outer ring starting from its endface 2b. The inner ring 1 is only stressed in compression and, therefore, this inner ring will only be plastically deformed.

Figure 3:
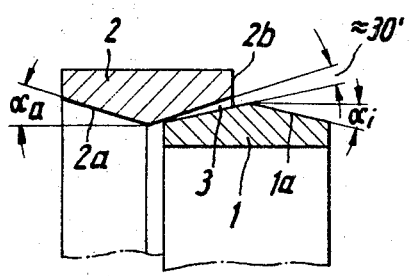
FIG. 3 is a partial axial cross-section of rings of a friction spring according to the present invention.

FIG. 3 partially illustrates a friction spring according to the present invention in which the angle $\alpha_i$, which the outer surface of the inner ring 1 includes with its axis, is smaller than the angle $\alpha_a$, which the inner surface 2a of the outer ring 2 includes with its axis. In the non-loaded condition of the spring, as shown in FIG. 3, a gap 3 of about 30 minutes is thereby formed between the outer surface 1a of the inner ring 1 and the inner surface 2a of the outer ring 2, which gap has an apex directed toward a plane of symmetry normal to the axis of the outer ring 2.

Figure 4:
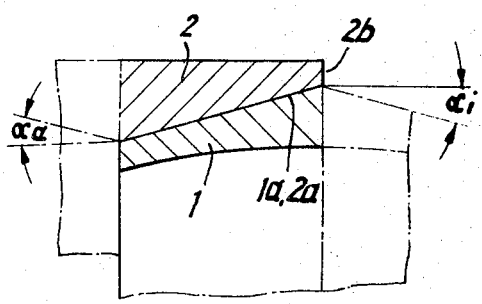
FIG. 4 is an axial cross-section of half an outer ring and half an inner ring of the arrangement shown in FIG. 3 in axial compressed condition.

FIG. 4 illustrating half of an inner ring and half of an outer ring of the spring of FIG. 3, clearly shows the ring halves in fully engaged position under the influence of an axial force P. During movement of the inner ring 1 towards the left, as viewed in FIG. 4, under the influence of the axial force P, the left end of the inner ring 1, that is the end of the inner ring at which the same has the smallest cross-section will, due to the difference between the angle $a_i$ and $\alpha_a$, engage first with a portion of the outer ring 2 in the region of its largest cross-section so that the left end of the inner ring 1, as viewed in FIG. 4, will be deformed as illustrated in this figure and thereby stressed under compression, whereas the outer ring 2 in the region of its endface 2b will be relieved of any excessive stresses so that a destruction of the outer ring will not occur.

The friction spring according to the present invention differs, therefore, from friction springs according to the prior art in that the useful life of this friction spring according to the present invention is, if subjected to the same loading, greatly increased as compared to friction springs of the prior art, or in other words, a friction spring according to the present invention may be loaded to a higher extent than a friction spring according to the prior art while providing the same working service.

It will be understood that each of the elements described above, or two or more together, may also find a useful application in other types of friction springs differing from the types described above.

While the invention has been illustrated and described as embodied in a friction spring in which the cone angle of the outer surfaces of the inner rings is smaller than the cone angle of the inner surfaces of the outer rings, it is not intended to be limited to the details shown, since various modification and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A friction spring comprising at least two outer rings having inner conical surfaces and at least one inner ring located between said outer rings and having outer conical surfaces in contact with said inner conical surfaces of said outer rings and arranged in such a manner that said surfaces may slidingly move relative to each other under application of axial pressure to said rings, the cone angle of said outer surface of said inner ring being smaller than the cone angle of said inner surface of said outer rings so that in unstressed condition of said rings the inner ring will engage only with line contact at its opposite small diameter end edges the outer rings in the region of their largest cross-sections while the remainder of said inner surfaces of said outer rings will be out of contact with the respective outer conical surfaces of said inner ring, whereby upon application of axial pressure to and resulting radial deformation of said rings, the inner ring, which is stressed under compression, will be deformed most in the region of its opposite small diameter ends while the line contact between the rings will gradually change to a full contact between the outer conical surfaces of the inner ring and the respective inner conical surfaces of the outer rings and the latter, which are stressed under tension, will be relieved of excessive stresses at the respective ends thereof so that tearing of the outer rings at said ends will be avoided.

2. A friction spring as defined in claim 1, wherein the difference between said cone angles is about 1 degree.

3. A friction spring as defined in claim 1, wherein said outer rings are circumferentially closed rings and wherein said inner ring is a split ring.

4. A friction spring as defined in claim 1, wherein said inner and outer rings are circumferentially closed rings.

References Cited

UNITED STATES PATENTS 2,281,955 5/1942 Rosenzweig.
3,116,056 12/1963 Maier.

FOREIGN PATENTS 441,741 3/1927 Germany.

JAMES B. MARBERT, Primary Examiner

U.S. Cl. X.R.

267—61